United States Patent [19]

Smith et al.

[11] 3,976,630

[45] Aug. 24, 1976

[54] PROCESS AND CATALYST FOR PRODUCTION OF RUBBERY POLYMERS

[75] Inventors: David R. Smith; Robert P. Zelinski, both of Bartlesville, Okla.

[73] Assignee: Phillips Petroleum Company, Bartlesville, Okla.

[ * ] Notice: The portion of the term of this patent subsequent to Apr. 13, 1982, has been disclaimed.

[22] Filed: Apr. 16, 1956

[21] Appl. No.: 578,166

Related U.S. Application Data

[63] Continuation-in-part of Ser. No. 541,033, Oct. 17, 1955, abandoned.

[52] U.S. Cl. .................................. 526/335; 526/159
[51] Int. Cl.² ....................... C08F 4/64; C08F 36/06
[58] Field of Search .................................... 260/94.3

[56] References Cited
UNITED STATES PATENTS 3,178,402    4/1965    Smith et al. .................... 260/94.2

FOREIGN PATENTS OR APPLICATIONS

| 627,741 | 9/1961 | Canada |
| 914,246 | 12/1962 | United Kingdom |
| 919,244 | 2/1963 | United Kingdom |
| 920,147 | 3/1963 | United Kingdom |

OTHER PUBLICATIONS

Moyer et al., Journal Poly. Sci. Pt. A, vol. 3, pp. 217–229 (1965).

*Primary Examiner*—Edward J. Smith

[57]    ABSTRACT

Rubbery polybutadiene containing at least 85 percent cis 1,4-addition can be made by polymerizing 1,3-butadiene with a catalyst formed from trialkylaluminum, for example, triethylaluminum, and titanium tetraiodide. The rubbery polybutadiene exhibits low hysteresis and is particularly useful in the manufacture of tires.

6 Claims, No Drawings

PROCESS AND CATALYST FOR PRODUCTION OF RUBBERY POLYMERS

This application is a continuation-in-part of our copending application Ser. No. 541,033 filed Oct. 17, 1955 now abandoned.

This invention relates to a method for polymerizing a 1,3-butadiene and to a novel catalyst therefor. In one aspect, the invention relates to a method for producing cis 1,4-polybutadiene. In another aspect, the invention relates to a novel polymer of 1,3-butadiene containing a high percentage of cis 1,4-configuration.

Various methods are described in the literature for polymerizing 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,2-addition, the remainder being cis and trans 1,4-addition. When potassium and other alkali metals are employed as catalysts, the latter ratios may vary to some degree, but no polybutadiene containing more than about 35 percent of cis 1,4-configuration has been obtained. Alfin-catalyzed polybutadiene has from about 65 to about 75 percent trans 1,4-addition, from about 5 to about 10 percent cis 1,4-addition, and from about 20 to about 25 percent 1,2-addition. For a more complete discussion of the configuration of polybutadiene, reference is made to an article by J. L. Binder appearing in Industrial and Engineering Chemistry, No. 46, 1727, (August 1954). We have now discovered that novel and unique polymers of 1,3-butadiene containing high percentages of cis 1,4-configuration can be produced by proceeding in accordance with the instant invention.

It is an object of this invention to provide a novel method for polymerizing 1,3-butadiene to produce polymers containing high percentages of cis 1,4-configuration.

Another object of the invention is to provide a novel catalyst system for use in the polymerization of 1,3-butadiene.

A further object of the invention is to provide a method for polymerizing 1,3-butadiene to produce linear, soluble polymers.

A still further object of the invention is to provide a novel polymer of 1,3-butadiene with at least 85 percent and up to 90 percent and higher cis 1,4-addition.

Still another object of the invention is to provide a rubbery polymer of 1,3-butadiene, which possesses outstanding physical properties.

Other and further objects and advantages of the invention will become apparent to one skilled in the art upon consideration of the accompanying disclosure.

It has now been discovered that a novel and unique polymer of 1,3-butadiene is obtained when 1,3-butadiene is polymerized in the presence of a catalyst composition comprising (a) a trialkylaluminum, and (b) titanium tetraiodide. The polybutadiene produced by the process of this invention is a rubbery polymer which contains as high as 90 percent and higher cis 1,4-addition.

The trialkylaluminum employed in our catalyst system with titanium tetraiodide can be represented by the formula $R_3Al$, wherein R is an alkyl radical containing up to and including 6 carbon atoms. The alkyl groups can be either straight or branched chain alkyls, for example, ethyl, propyl, isopropyl, n-butyl, isobutyl, pentyl, isohexyl or n-hexyl. Furthermore, it is to be understood that the alkyl groups in the aforementioned general formula can be the same or they can be different. For example, it is within the scope of the invention to utilize a trialkylaluminum such as diisobutylmonoethylaluminum in the catalyst composition of our invention. However, the trialkylaluminums which we prefer to employ in our catalyst system are triethylaluminum and triisobutylaluminum since these compounds have a high activity in the process of this invention. It is also within the purview of the invention to employ mixtures of trialkyaluminums in our catalyst system. It is, of course, to be understood that minor amounts of other materials which have no catalytic effect may be included in the system without departing from the spirit or scope of the invention.

The amount of trialkylaluminum used in the catalyst composition of this invention is usually in the range of 1.25 to 50 mols per mol of titanium tetraiodide. A preferred ratio, however, is from 1.5 to 35 mols of trialkylaluminum per mol of titanium tetraiodide. When triisobutylaluminum is used in the catalyst system, a preferred ratio is from 1.7 to 35 mols of triisobutylaluminum per mol of titanium tetraiodide. In the case of triethylaluminum, a preferred ratio is from 1.5 to 10 mols of triethylaluminum per mol of titanium tetraiodide. It has been found that greatly increased yields of the polybutadiene product are obtained when using a catalyst composition falling within the preferred ratio.

The catalyst system of this invention appears to be unique in several respects, particularly with regard to the unexpected results obtained. Firstly, when used to polymerize 1,3-butadiene, a polybutadiene is produced which contains a preponderance of cis 1,4-configuration. From all indications the literature contains no description of a polymer having the configuration of the polymer produced in accordance with the process of this invention. Furthermore, titanium halides other than titanium tetraiodide when used with trialkylaluminums to polymerize 1,3-butadiene do not produce the cis 1,4-polybutadiene of this invention. Accordingly, the instant catalyst system appears to be in a category by itself insofar as the production of cis 1,4-polybutadiene is concerned.

The catalyst system of this invention is also outstanding in aspects other than in its unexpected ability to produce a new type of polymer. Thus, when using the catalyst system to polymerize 1,3-butadiene, quantitative conversion is accomplished in a matter of minutes to give products which are gel-free, with inherent viscosities as high as 5.5. It has also been found that faster reaction rates and greater yields are possible when polymerizing 1,3-butadiene with the instant catalyst system than when catalysts containing titanium halides other than titanium tetraiodide are used. In this regard, productivities greater than 150 pounds of polybutadiene per pound of catalyst have been obtained.

The polybutadiene produced in accordance with this invention is a rubbery polymer. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80°F. of over 100 percent of a specimen's original length with a retraction of at least 90 percent within one minute after release of the stress necessary to elongate to 100 percent. The rubbery polymers produced in accordance with this invention are essentially linear, soluble polymers. With regard to the solubility of the rubbery polymers of this invention, they contain substantially no gel as determined by the standard gel determination test. The below described procedure is followed in carrying out this test. If the gel content is expected to be below 50 percent, the sample of polymer to be tested for gel should weigh from 0.10 to 0.13 grams while if the gel content is expected to be above 50 percent, a sample weighing from 0.13 to 0.18 is used. The sample is placed in a cage of calibrated weight, fabricated from 80-mesh 18-8 stainless steel screen. The cage containing the polymer is then placed in a 4-ounce wide mouth bottle into which 100 milliliters of reagent grade benzene is pipetted. The bottle is then capped tightly with a threaded cap, fitted with a cardboard gasket and protected with a circle of aluminum foil. The bottle is then placed in the dark for at least 24 hours and preferably not more than 48 hours. No shaking or stirring of the contents is permissible during this dissolution period. At the end of this period, the cage is withdrawn from the bottle and placed in a wide mouth 2-ounce bottle. The weight of the gel which is adhering to the cage is calculated and expressed as swelled gel. The cage containing the gel is then dried in a vacuum oven maintained at a temperature between 70° and 80°C. after which the weight of dry gel is determined. The gel is then calculated as the weight percent of the rubbery polymer which is insoluble in benzene. The swelling index is determined as the weight ratio of swelled gel to dry gel.

The polymerization method of this invention can be carried out at any temperature within the range of zero to 150°C., but it is preferred to operate in the range of 10° to 50°C. It is preferred to carry out the polymerization in the presence of an inert hydrocarbon diluent, although the polymerization can be carried out without the use of such a diluent. The polymerization reaction can be carried out under autogenous pressure or any suitable pressure sufficient to maintain the reaction mixture substantially in the liquid phase. The pressure will thus depend upon the particular diluent being employed and the temperaure at which the polymerization is carried out. However, higher pressures can be employed if desired, these pressures being obtained by some such suitable method as the pressurization of the reactor with a gas which is inert with respect to the polymerization reaction.

The amount of the catalyst composition of this invention which is used in the polymerization of 1,3-butadiene can vary over a wide range. The concentration of the total catalyst composition is usually in the range of about 0.05 weight percent to 10.0 weight percent, or higher, preferably in the range 0.05 weight percent to 5 weight percent, based on the total amount of 1,3-butadiene charged to the polymerization reactor. In general, at the lower mol ratios of trialkyl aluminum to titanium tetraiodide, it is frequently desirable to operate above the minimum level of catalyst concentration.

Diluents suitable for use in the polymerization process are hydrocarbons which are not detrimental to the polymerization reaction and which are liquid under conditions of the process. Suitable diluents include aromatics, such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in the practice of the process of this invention. Cycloparaffins, such as cyclohexane, can also be used although they are less desirable than the other diluents. Furthermore, mixtures of any of the aforementioned hydrocarbons can be used as diluents.

The process of this invention can be carried out as a batch process by charging 1,3-butadiene into a reactor containing catalyst and diluent, or the process can be carried out continuously by maintaining the above-mentioned concentrations of reactants in the reactor for a suitable residence time. The residence time in a continuous process will, of course, vary within rather wide limits depending upon such variables as temperature, pressure, the ratio of catalyst components, and catalyst concentration. In a continuous process, the residence time will generally fall within the range of one second to one hour when conditions within the specified ranges are employed. When a batch process is being employed, the time for the reaction can be as high as 24 hours or more.

Various materials are known to be destructive to the catalyst composition of this invention. These materials include carbon dioxide, oxygen and water. It is highly desirable, therefore, that the 1,3-butadiene be freed of these materials, as well as other materials which tend to inactivate the catalyst. Any of the known means for removing such contaminants can be used. Also, when a diluent is employed in the process, it is preferred that this material be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. Thus, it has been found that satisfactory polymerization rates can be obtained when as much as 500 to 1000 parts of water per 1,000,000 parts of reactor charge are present in the reactor. It is to be understood, however, that the amount of water which may be tolerated in the reaction mixture is insufficient to completely deactivate the catalyst.

At the completion of the polymerization reaction, when a batch process is used, the total reaction mixture is then treated to inactivate the catalyst and precipitate the rubbery polymer, as by adding an alcohol. The polymer is then separated from the alcohol and diluent by any suitable means, such as decantation or filtration. In order to purify the rubbery polymer, the separated polymer can be redissolved in a suitable diluent and then again precipitated by the addition of an alcohol. The polymer is again separated, as indicated hereinbefore, and then dried. Any of the diluents listed hereinabove can be used in this purification step to redissolve the polymer. When the process of the invention is carried out continuously, the total effluent from the reactor is pumped from the reactor to a catalyst-inactivating zone where the reactor effluent is contacted with a suitable catalyst-inactivating material, such as an alcohol. When an alcohol is used as the catalyst-activating material, it also acts to precipitate the polymer. In the event other catalyst-inactivating materials are employed which do not perform this dual function, it is also necessary to add a suitable material, such as an alcohol, to precipitate the polymer. The diluent and alcohol are then separated from the polymer by filtration or other suitable means and then dried. The rubbery polymer can also be redissolved in a suitable diluent and again precipitated, as described above, in order to purify the material. The diluent and alcohol can be separated, for example by fractional distillation, and reused in the process. It is also within the scope of the invention to utilize an antioxidant, such as phenyl-beta-naphthylamine, in the process of this invention to prevent oxidation of the rubbery polymer. The anti-oxidant can be added to the reaction mixture prior to precipitation of the polymer, to the solution of redissolved polymer, or to the diluent in which the polymer is to be subsequently redissolved.

The rubbery polymers which result when 1,3-butadiene is polymerized by the method of this invention can be compounded by any of the known methods such as have been used in the past for compounding natural rubber. Vulcanization accelerators, reinforcing agents, and fillers such as have been employed in natural rubber can likewise be employed when compounding the polymers of this invention.

The cis 1,4-polybutadiene produced in accordance with this invention possesses physical properties which render it superior to conventional synthetic rubbers. Because conventional synthetic rubbers exhibit high hysteresis, i.e., high heat build-up, they are not too satisfactory for certain uses, e.g., in the manufacture of truck tire carcasses. The great stresses to which truck tires are subjected cause those made of conventional synthetic rubber to become extremely hot, resulting in blow-outs in some cases. For this reason, truck tire carcasses are almost exclusively made from high grade natural rubber which has the property of low hysteresis. It has now been found that the cis 1,4-polybutadiene of this invention in vulcanized rubber stocks shows lower hysteresis than conventional synthetic rubber. This property of the novel polymer of this invention renders it especially suitable as a substitute for natural rubber in the manufacture of heavy truck tires. The cis 1,4-polybutadiene in vulcanized rubber stocks also show higher resilience, lower freeze point, greater ease of mill breakdown, and higher tensile strength at 200°F., than conventional emulsion polymerized polybutadiene.

A more comprehensive understanding of the invention can be obtained by referring to the following illustrative examples which are not intended, however, to be unduly limitative of the invention.

EXAMPLE I

A number of runs were made in which 1,3-butadiene was polymerized to rubbery polymer by a catalytic polymerization employing a catalyst system comprising triisobutylaluminum and titanium tetraiodide. These runs were carried out by the following procedure.

Benzene was charged to a one-quart beverage bottle, after which an amount of triisobutylaluminum was charged to the bottle. The triisobutylaluminum was charged as a solution in approximately 2 mls. of a hydrocarbon. Following this charge, an amount of titanium tetraiodide was charged to the bottle, after which the bottle was placed in an ice bath so as to freeze the contents of the bottle. The 1,3-butadiene was then charged to the bottle. During the charging of the catalyst components and the butadiene, the vapor space in the bottle was continuously flushed with nitrogen. After these materials were charged, the bottle was sealed with a neoprene seal and a crown bottle cap which was punched so as to expose a portion of the neoprene seal. The bottle was then placed in a 30°C. temperature bath and tumbled in this bath for 2 hours. At the end of this time, the bottle was removed, and the contents were noted to be of a viscous nature. The bottle contents were then dumped into 1 liter of isopropyl alcohol, and the resulting mixture was stirred vigorously. The polymer which was present precipitated, and this rubbery polymer was removed and dried in a vacuum oven. The yield of polymer and the percent conversion was then calculated.

The polymer was then tested to determine its gel content by the standard gel determination test which has been described hereinbefore. The solution of polymer in benzene which results when the polymer is dissolved in this test is measured to determine its viscosity, and this viscosity is considered to be the inherent viscosity of the polymer. In measuring inherent viscosity by this method, it should be noted that this does not include that portion of the polymer which is insoluble (gel).

The above-described runs were carried out according to the following polymerization recipe.

Polymerization Recipe

| | Parts by Weight | | |
|---|---|---|---|
| | A | B | C |
| Butadiene | 100 | 100 | 100 |
| Benzene | 440 | 440 | 420 |
| Triisobutylaluminum (TBA) | 1.39–1.4 | Variable | Variable |
| Titanium Tetraiodide (TTI) | Variable | 0.78 | Variable |
| Temperature, C | 30 | 30 | 30 |
| Time, hours | 2 | 2 | 2 |

In the runs which were carried out according to the above-described procedure and polymerization recipes, the amount of each of the individual catalyst components was varied so as to vary the mol ratio of the triisobutyl aluminum to the titanium tetraiodide. The results of these runs are presented below in Table I.

TABLE I

| Run No. | Recipe | TBA/TTI, Mol Ratio | TTI Parts by Weight | Mmole | TBA Parts by Weight | Mmole | Conversion, Per Cent | Inherent Viscosity | Gel |
|---|---|---|---|---|---|---|---|---|---|
| 1 | A | 20 | 0.196 | 0.353 | 1.39 | 7.0 | 28 | 5.30 | Trace |
| 2 | A | 17 | 0.227 | 0.408 | 1.39 | 7.0 | 69 | 5.64 | 0 |
| 3 | A | 14.3 | 0.27 | 0.49 | 1.4 | 7.0 | 53 | 3.63 | 0 |
| 4 | A | 10.0 | 0.39 | 0.70 | 1.4 | 7.0 | 73 | 3.87 | Trace |
| 5 | A | 7.4 | 0.52 | 0.94 | 1.4 | 7.0 | 82 | 3.00 | 0 |
| 6 | A | 5.0 | 0.78 | 1.40 | 1.4 | 7.0 | 99 | 3.17 | 0 |

TABLE I-continued

| Run No. | Recipe | TBA/TTI, Mol Ratio | TTI Parts by Weight | Mmole | TBA Parts by Weight | Mmole | Conversion, Per Cent | Inherent Viscosity | Gel |
|---|---|---|---|---|---|---|---|---|---|
| 7 | A | 4.0 | 0.97 | 1.75 | 1.4 | 7.0 | 92 | 2.68 | 0 |
| 8 | A | 3.0 | 1.29 | 2.33 | 1.4 | 7.0 | 92 | 2.66 | 0 |
| 9 | A | 2.0 | 1.94 | 3.5 | 1.4 | 7.0 | 95 | 2.10 | 0 |
| 10 | A | 1.7 | 2.26 | 4.08 | 1.4 | 7.0 | 22 | 1.43 | 0 |
| 11 | B | 10.0 | 0.78 | 1.4 | 2.78 | 14.0 | 19 | 1.16 | 0 |
| 12 | B | 7.4 | 0.78 | 1.4 | 2.08 | 10.5 | 57 | 1.55 | 0 |
| 13 | B | 5.0 | 0.78 | 1.4 | 1.39 | 7.0 | 99 | 3.17 | 0 |
| 14 | B | 4.0 | 0.78 | 1.4 | 1.11 | 5.6 | 98 | 3.59 | 0 |
| 15 | B | 3.0 | 0.78 | 1.4 | 0.83 | 4.2 | 98 | 3.32 | 0 |
| 16 | B | 2.5 | 0.78 | 1.4 | 0.69 | 3.5 | 32 | 2.68 | 0 |
| 17 | C | 8.4 | 0.13 | 0.26 | 0.44 | 2.22 | 96 | Not measured | 0 |

EXAMPLE II

A series of runs were made in which 1,3-butadiene was polymerized to rubbery polymer employing a catalyst system consisting of triethylaluminum and titanium tetraiodide. The procedure by which these runs were carried out is set forth hereinbelow.

Benzene, an amount of titanium tetraiodide, and an amount of triethylaluminum were charged to one-quart beverage bottle while flushing with nitrogen. The triethylaluminum was charged as a solution in approximately 2 mls. of a hydrocarbon. After these materials were charged, the bottle was sealed with a neoprene seal and a crown bottle cap which was punched so as to expose a portion of the neoprene seal. The 1,3-butadiene was then charged to the bottle by means of a syringe which was inserted through the neoprene seal. The bottle was then placed in a 30°C. temperature bath and tumbled in this bath for a period of time which varied with each individual run. At the end of this time, the bottle was removed, and the contents of the bottle were then dumped into 1 liter of isopropyl alcohol. The isopropyl alcohol-benzene-polymer mixture was then stirred vigorously. The polymer which was present precipitated, and this polymer was recovered and dried in a vacuum oven. The polymer from each of these runs was then weighed to determine yield and conversion, after which the polymer from each run was tested to determine the gel content and the inherent viscosity. The determination of gel and inherent viscosity was carried out by the standard determination procedure described hereinbefore.

The runs which were carried out by the above-described procedure were made according to the following polymerization recipe.

Polymerization Recipe

| | Parts by Weight |
|---|---|
| Butadiene | 100 |
| Benzene | 440 (500 cc) |
| Triethylalumium (TEA) | 0.57 (5.0 mmole) |
| Titanium Tetraiodide (TTI)* | Variable |
| Temperature, °C. | 30 |
| Time, Hours | Variable |

*Charged as small granules.

The results of a number of these runs are presented below in Table II.

TABLE II

| Run No. | TEA/TTI, Mol Ratio | TTI Parts By wt. | Mmole | Time Hours, | Conversion Per Cent** | Inherent Viscosity Unmilled | Milled |
|---|---|---|---|---|---|---|---|
| 18 | 10 | 0.28 | 0.50 | 15 | 30 | 4.12 | 3.88 |
| 19 | 7.6 | 0.37 | 0.66 | 15 | 101 | 5.48 | 5.32 |
| 20 | 4.0 | 0.69 | 1.25 | 15 | 98 | 2.61 | 2.57 |
| 21 | 3.0 | 0.94 | 1.68 | 15 | 99 | 2.67 | 2.65 |
| 22 | 3.0 | 0.94 | 1.68 | 1 | 98 | 2.14 | — |
| 23 | 2.4 | 1.17 | 2.11 | 17 | 100 | 2.62 | 2.70 |
| 24 | 2.0 | 1.39 | 2.50 | 17 | 100 | 1.99 | 1.89 |
| 25 | 1.5 | 1.85 | 3.32 | 17 | 99 | 2.57 | 2.47 |

**Conversion over 100 per cent probably due to inaccurate charging of butadiene by syringe.

In the above runs, all of the samples were gel-free.

It was attempted to polymerize isoprene employing the catalyst system used in the above runs. The same polymerization recipe was employed as described above, except that isoprene was substituted for the butadiene. In the isoprene runs, the mol ratio of TEA/TTI was varied over the range from 1.0–9.8:1. None of these combinations caused any formation of polymer which was insoluble in isopropyl alcohol. These experiments were distinguished by the rapid development of an iodine-like color in the reaction mixtures, a phenomenon unobserved in identical experiments with butadiene. The failure of these experiments cannot be attributed to impurities in the reagents, since in simultaneous control experiments, polyisoprene was made in 18 percent conversion by use of a catalyst system consisting of triethylaluminum and titanium tetrachloride, and polybutadiene was formed in 98 percent conversion by initiation with triethylaluminum and titanium tetraiodide.

EXAMPLE III

A number of runs were made in which it was attempted to polymerize 1,3-butadiene to rubbery polymer by a catalyst system consisting of triethylaluminum and titanium tetrafluoride. These runs were carried out by following essentially the same procedure previously described, and according to the recipe set forth below.

RECIPE

| | Parts by Weight |
|---|---|
| 1,3-butadiene | 100 |
| Benzene | 400 |
| Triethylaluminum (TEA) | 0.57 (5.0 mmole) |
| Titanium tetrafluoride (TTF) | variable |
| Temperature, °C. | 30 |
| Time, hours | 16 |

Polymerization Recipe-continued

| | Parts by Weight |
|---|---|
| Titanium tetrachloride (TTC) | Variable |
| Temperature, C | 30 |
| Time, hours | 4 |

The results of these runs are presented below in Table III.

TABLE III

| Run No. | TBA/TTC Mol Ratio | TTC, Parts By Wt. | Conversion, Per Cent | Inherent Viscosity | Gel, Per cent | Swelling Index of the Gel | Chemical Unsaturation* |
|---|---|---|---|---|---|---|---|
| 26 | 4.0 | 0.332 | Trace | — | 66 | 4 | — |
| 27 | 3.0 | 0.445 | 1 | 2.15 | 35 | 3 | Not measured |
| 28 | 2.5 | 0.532 | 12 | 2.84 | 17 | 20 | Not measured |
| 29 | 2.0 | 0.721 | 25 | 3.01 | 10 | 32 | 96.6 |
| 30 | 1.8 | 0.739 | 36 | 3.25 | 8 | 37 | Not measured |
| 31 | 1.6 | 0.832 | 39 | 3.26 | 18 | 35 | 95.4 |
| 32 | 1.4 | 0.950 | 50 | 3.70 | 12 | 43 | Not measured |
| 33 | 1.2 | 1.109 | 76 | 3.62 | 13 | 49 | 98.3 |
| 34 | 1.0 | 1.330 | 71 | 3.34 | 20 | 46 | Not measured |
| 35 | 0.8 | 1.662 | 45 | 3.10 | 51 | 20 | 63.3 |
| 36 | 0.7 | 1.900 | 37 | 2.66 | 62.6 | 17 | Not measured |
| 37 | 0.6 | 2.22 | 8 | — | 72.8 | 37 | 24.2 |
| 38 | 0.5 | 2.66 | 15 | 0.09 | 47.3 | 6 | Not measured |
| 39 | 0.4 | 3.33 | 15 | — | 88 | 59 | Not measured |
| 40 | 0.2 | 6.65 | 29 | 0.15 | 20 | 15 | Not measured |
| 41 | 0.1 | 13.3 | 50 | 0.12 | 7.5 | 17 | Not measured |

*The polymers produced in Runs 26 to 36 were elastomeric in nature, while those in Runs 37 to 41 were solid polymers of a resinous nature. This is evidenced by the amount of chemical unsaturation present in these polymers as well as by the low inherent viscosity of these materials.

Polymerization runs were made at TEA/TTF mol ratios of 1.95, 1.33, 1.29, 1.16, 1.08, 0.98, 0.96, and 0.91. No polymer resulted in 16 hours from any of these runs.

EXAMPLE IV

A series of runs was made in which 1,3-butadiene was polymerized to rubbery polymer employing a catalyst system consisting of triisobutylaluminum and titanium tetrachloride. These runs were carried out in order to provide a comparison between the catalyst system of triisobutylaluminum and titanium tetrachloride with the catalyst system of triisobutylaluminum and titanium tetraiodide. These runs were carried out according to the following procedure. Benzene, an amount of triisobutylaluminum and an amount of titanium tetrachloride were charged to a one-quart beverage bottle by the same procedure employed in Example III. The triisobutylaluminum was charged as a solution in approximately 2 milliliters of a hydrocarbon. The bottle was then sealed with a neoprene seal and a crown bottle cap as previously described, and the bottle was then placed in a 30°C. temperature bath. The bottle was then tumbled in this bath for four hours. After the polymerization period, the bottle was opened, and the polymer was recovered by the same procedure employed in Examples I, II, and III. The polymer was then tested to determine inherent viscosity, gel and swelling index. Prior to the determination of these properties, the yield of polymer was determined and the percent conversion was calculated.

The polymerization runs which were carried out according to the above-described procedure were made according to the following polymerization recipe.

Polymerization Recipe

| | Parts by Weight |
|---|---|
| Butadiene | 100 |
| Benzene | 440 |
| Triisobutylaluminum (TBA) | 1.39 (7.0 mmole) |

It is seen that the polymer prepared using a catalyst consisting of triisobutylaluminum and titanium tetrachloride has a high gel content as compared to the rubbery polymers of this invention which are substantially gel-free. Furthermore, it is noted that in general, much higher conversions are obtained with the catalyst of this invention than with the catalyst used in this example.

EXAMPLE V

A number of the polymers produced in the polymerization runs described in the preceding examples were examined by infrared analysis. This work was carried out to determine the percentage of the polymer formed by cis 1,4-addition, trans 1,4-addition and 1,2-addition of the butadiene.

The polymers were dissolved in carbon disulfide to form a solution having 20 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where:

$\epsilon$ = extinction coefficient (liters-mols$^{-1}$-microns$^{-1}$);
$E$ = extinction (log Io/I); $t$ = path length (microns); and
$c$ = concentration (mols double bond/liter). The extinction was determined at the 10.35 micron band and the extinction coefficient used was $1.21 \times 10^{-2}$ (liters-mols$^{-1}$-microns$^{-1}$).

The percent of the total unsaturation present as 1,2- (or vinyl) was calculated according to the above equation, using the 11.0 micron band and an extinction coefficient of $1.52 \times 10^{-2}$ (liters-mols$^{-1}$-microns$^{-1}$).

The percent of the total unsaturation present as cis 1,41 was obtained by subtracting the trans 1,4- and 1,2- (vinyl) determined according to the above methods from the theoretical unsaturation assuming one double bond per each $C_4$ unit in the polymer.

The polymers which were examined were prepared by polymerization runs which were carried out according to the following recipes.

RECIPES

| | Parts by Weight | | |
|---|---|---|---|
| | A | B | C |
| 1,3-Butadiene | 100 | 100 | 100 |
| Benzene | 880 | Variable | 440 |
| Triethylaluminum | 2.28(20 mmoles) | 0.57(5.0Mmoles) | 0 |
| Triisobutylaluminum | 0 | 0 | 1.4(7.0 mmoles) |
| Titanium tetrachloride | Variable | 0 | 0 |
| Titanium tetraiodide | 0 | Variable | 0.78 |
| Temperature, °C. | 30 | 30 | 30 |
| Time, hours | 18 | Variable | 2 |

The results of these runs are presented hereinbelow in Table IV.

The runs were made according to the following polymerization recipe.

POLYMERIZATION RECIPE

| | Parts by Weight | |
|---|---|---|
| | A | B |
| Butadiene | 100 | 100 |
| Benzene | 440 | Variable |
| Triisobutylaluminum (TBA) | Variable | Variable |
| Titanium Tetraiodide (TTI) | Variable | Variable |
| TBA:TTI, mol ratio | 5 | 4.8–5 |
| Temperature, C | 30 | 30 |
| Time, hours | 2 | 2 |

TABLE IV

| Run No. | 42 | 43 | 44 | 45 | 46 | 47 | 48 |
|---|---|---|---|---|---|---|---|
| Recipe | B | B | B | B | B | C | A |
| Titanium tetrahalide employed | TTI | TTI | TTI | TTI | TTI | TTI | TTC |
| Organoaluminum employed | TEA | TEA | TEA | TEA | TEA | TBA | TEA |
| Polymerization time, hours | 17 | 2 | 2 | 2 | 2 | 2 | 18 |
| Parts by weight of benzene | 440 | 880 | 440 | 440 | 440 | 440 | 880 |
| Parts by weight of titanium tetrahalide | 0.927 | 0.565 | 0.698 | 1.392 | 1.863 | 0.78 | 4.22 |
| Millmoles of titanium tetrahalide | 1.67 | 1.01 | 1.26 | 2.51 | 3.35 | 1.4 | 20 |
| Mol ratio, organoalumium to titanium tetrahalide | 3.0 | 5.0 | 4.0 | 2.0 | 1.5 | 5.0 | 0.9 |
| % trans 1,4-addition | 10.5 | 3.0 | 7.5 | 7.0 | 9.5 | 3.0 | 31 |
| % 1,2-addition | 4.5 | 4.5 | 4.5 | 4.0 | 4.0 | 4–5 | 1.5 |
| % cis 1,4-addition | 85.0 | 92.5 | 88.0 | 89.0 | 86.5 | 92–93 | 67.5 |

From an examination of the above data, it is seen that the polybutadiene prepared in accordance with this invention contains at least 85 percent and up to 90 percent and higher cis 1,4-addition.

The results of a number of these runs are set forth below in Table V.

TABLE V

| Run No. | Recipe | TBA/TTI Mol Ratio | TBA Grams | TBA Millimoles | TTI Grams | TTI Millimoles | Benzene, Grams | Conversion, Per Cent | Productivity Gms. Polymer/Gms. Catalyst | Inherent Viscosity |
|---|---|---|---|---|---|---|---|---|---|---|
| 49 | A | 5.0 | 0.92 | 4.7 | 0.51 | 0.92 | 440 | 94 | 66 | 3.20 |
| 50 | A | 5.0 | 0.69 | 3.5 | 0.39 | 0.70 | 440 | 92 | 85 | 3.71 |
| 51 | A | 5.0 | 0.55 | 2.8 | 0.31 | 0.56 | 440 | 82 | 96 | 4.52 |
| 52 | A | 5.0 | 0.55 | 2.8 | 0.31 | 0.56 | 440 | 93 | 108 | 5.48 |
| 53 | A | 5.1 | 0.46 | 2.3 | 0.26 | 0.46 | 440 | 94 | 131 | 5.34 |
| 54 | A | 5.0 | 0.40 | 2.0 | 0.22 | 0.40 | 440 | 96 | 155 | 5.54 |
| 55 | B | 4.9 | 0.92 | 4.7 | 0.54 | 0.96 | 333 | 95 | 63 | 3.09 |
| 56 | B | 5.0 | 0.69 | 3.5 | 0.39 | 0.70 | 250 | 88 | 82 | 2.99 |
| 57 | B | 4.9 | 0.55 | 2.8 | 0.32 | 0.57 | 200 | 74 | 85 | 3.77 |
| 58 | B | 4.8 | 0.40 | 2.0 | 0.23 | 0.42 | 143 | 89 | 141 | 5.70 |

In the above runs, none of the polymers contained gel.

EXAMPLE VI

A series of runs were made using the catalyst system of Example I. In these runs, the total amount of catalysts present, triisobutylaluminum and titanium tetraiodide, was varied. In addition, the amount of diluent employed was reduced below 440 parts by weight in several of these runs to determine the effect of reduced amounts of diluent upon the polymerization.

EXAMPLE VII

Samples of polymer from fourteen polymerization runs, which used a catalyst system consisting of triisobutylaluminum (TBA) and titanium tetraiodide (TTI) were blended together. All of the polymers in this blend had an inherent viscosity between 2.0 and 3.0, and the Mooney viscosity of the blend was 57 (ML-4). The samples which were blended weighed from 3 to 14 grams each. The mol ratios of TBA/TTI in the runs from which the samples were taken were all within the range of 2.0 to 8.3, while most of them were made at a mol ratio of TBA/TTI in the range of 4.0 to 5.0. The total catalyst present in each of these runs fell within the range of 0.016 to 0.033 weight percent based on the 1,3-butadiene. In a similar manner, samples of polymer from three polymerization runs employing a catalyst consisting of triisobutylaluminum and titanium tetrachloride were blended together. The data for this blend are presented below in Table VI. These runs were carried out following the same procedure as described in Example IV.

and the polymer which had been prepared by emulsion polymerization were converted into compounded rubber stocks according to the following recipes.

COMPOUNDING RECIPES

|  | Triisobutyl-Aluminum-Titanium Tetraiodide Polymer | Triisobutyl-Aluminum-Titanium Tetrachloride Polymer | Emulsion Polymer |
|---|---|---|---|
| Polymer | 100 | 100 | 100 |
| Carbon Black (Philblack "O")[1] | 50 | 50 | 50 |
| Stearic Acid | 4.0 | 3.0 | 1.0 |
| Zinc Oxide | 3.0 | 3.0 | 3.0 |
| Flexamine[2] | 1.0 | 1.0 | 1.0 |
| Sulfur | 1.6 | 3.0 | 2.25 |
| Santocure[3] | 1.0 | 1.0 | 0.8 |

[1]High abrasion carbon black
[2]Physical mixture containing 65 per cent of a complex diarylamine-ketone reaction product and 35 per cent of N,N'-diphenyl-p-phenylene-diamine.
[3]N-cyclohexyl-2-benzothiazylsulfenamide.

The compounded stocks containing the polymers resulting from the triisobutylaluminum-titanium tetrahalide-catalyzed polymerizations were cured at 307°F. for 30 minutes, while the compounded stock containing emulsion-polymerized polybutadiene was cured at 307°F. for 45 minutes. The physical properties of these cured rubber stocks were then determined. These properties are expressed below as Table VII.

TABLE VII

|  | Polymer From TBA-TTI[1] Catalyzed Polymerization | Polymer From TBA-TTC[2] Catalyzed Polymerization | Emulsion Polymerized Polybutadiene |
|---|---|---|---|
| Tensile strength, psi | 3100 | 2280 | 2940 |
| 300% Modulus, psi | 1800 | 1960 | 1830 |
| Elongation, % | 430 | 340 | 420 |
| Tensile strength at 200 F, psi | 1700 | 1240 | 1100 |
| Heat build-up, °F. | 46.6 | 52.7 | 62.8 |
| Resilience, % | 77.4 | 73.8 | 63.9 |
| Shore Hardness | 67 | 68 | 64 |
| Freeze point, Gehman, °C. | −107 | −80 | −74 |

[1]Triisobutylalumium-Titanium tetraiodide
[2]Triisobutylaluminum-Titanium tetrachloride It is seen from the above table that the polymer which was prepared by a catalytic polymerization employing a catalyst system of triisobutylaluminum and titanium

TABLE VI

| Run No. | TBA/TTC Mol Ratio | TBA Parts per 100 parts Butadiene | TTC Parts per 100 parts Butadiene | Polymerization Time, hours | Mooney Viscosity (ML-4) | Grams Used in Blend |
|---|---|---|---|---|---|---|
| 59 | 1.5 | 3.96 | 2.53 | 17 | 13 | 130 |
| 60 | 1.2 | 0.792 | 0.632 | 17 | 47 | 46 |
| 61 | 1.5 | 3.96 | 2.53 | 16 | 26 | 17 |
|  |  |  |  |  | Total | 193 |

A sample of polybutadiene rubber prepared by a typical emulsion polymerization was also evaluated as a tread stock for comparison with the polymers which had been prepared by an organoaluminum-titanium tetrahalide catalyzed polymerization. The emulsion polymer was prepared using a ferrous sulfate-sodium formaldehyde sulfoxylate activator at a temperature of 41°F. (5°C.). The Mooney viscosity (ML-4) of the coagulated polymer was 28.

The blend of polymers from the triisobutylaluminum-titanium tetraiodide runs, the blend of polymers from the triisobutylaluminum-titanium tetrachloride runs, tetraiodide is a superior rubber. This is particularly evidenced by the superiority shown by this material in heat build-up, tensile strength at 200°F., resilience, and Gehman freeze point.

EXAMPLE VIII

Several polymerization runs were carried out by the same procedure employed in Example I except that either toluene or a mixture of toluene and benzene was employed as the diluent. These runs were carried out according to the following polymerization recipes.

POLYMERIZATION RECIPES

| | PARTS BY WEIGHT | |
|---|---|---|
| | A | B |
| Butadiene | 100 | 100 |
| Benzene | 0 | 440 |
| Toluene | 434 | Variable |
| Triethylaluminum (TEA) | 0.8 (7.0 mmole) | 0.8 (7.0 mmole) |
| Titanium tetraiodide (TTI) | Variable | Variable |
| Temperature, °C. | 30 | 30 |
| Time, hours | 3 | 3 |

The results of these runs are set forth below in Table VIII.

TABLE VIII

| Run No. | Recipe | TEA/TTI Mol Ratio | TTI Parts by Wt. | Mmole | Toluene Parts by Wt. | Conversion, Per Cent |
|---|---|---|---|---|---|---|
| 62 | A | 4.9 | 0.794 | 1.43 | 434 | 93 |
| 63 | B | 5.0 | 0.777 | 1.40 | 0.5 | 96 |
| 64 | B | 3.1 | 1.253 | 2.26 | 1.0 | 85 |
| 65 | B | 4.8 | 0.813 | 1.46 | 5.0 | 95 |
| 66 | B | 4.9 | 0.792 | 1.43 | 10.0 | 97 |

EXAMPLE IX

A number of runs were made in which 1,3-butadiene was polymerized to rubbery polymer by the method of Example II, except that either a mixture of benzene and n-butane or n-butane alone was employed as the diluent. These runs were carried out by the following polymerization recipes.

RECIPES

| | Parts by Weight | | | |
|---|---|---|---|---|
| | A | B | C | D |
| Butadiene | 100 | 100 | 100 | 100 |
| Benzene | 440 | 396 | 220 | 0 |
| n-butane | 0 | 44 | 150 | 300 |
| Triethylaluminum (TEA) | 0.80(7.0mmoles) | 0.80 | 0.80 | 0.80 |
| Titanium tetraiodide (TTI) | variable | variable | variable | variable |
| Temperature, °C. | 30 | 30 | 30 | 30 |
| Time, hours | 18 | 18 | 18 | 6 ½ |

The results of these runs are presented below in Table IX.

TABLE IX

| Run No. | Recipe | TTI parts by weight | Milli-moles | TEA/TTI Mol Ratio | Conversion % |
|---|---|---|---|---|---|
| 67 | A | 0.778 | 1.4 | 5.0 | 96 |
| 68 | A | 1.296 | 2.33 | 3.0 | 97 |
| 69 | B | 0.778 | 1.4 | 5.0 | 98 |
| 70 | B | 0.778 | 1.4 | 5.0 | 99 |
| 71 | B | 1.296 | 2.33 | 3.0 | 100 |
| 72 | B | 1.296 | 2.33 | 3.0 | 99 |
| 73 | C | 0.778 | 1.4 | 5.0 | 92 |
| 74 | C | 1.296 | 2.33 | 3.0 | 96 |
| 75 | D | 1.296 | 2.33 | 3.0 | 16 |

The rubbery polymers produced in accordance with this invention have utility in applications where natural and synthetic rubbers are used. They can be used in the manufacture of automobile tires and other rubber articles, such as gaskets, and tubing.

As will be evident to those skilled in the art, many variations and modifications can be practiced which fall within the scope of this invention. The invention resides in a novel polymer of 1,3-butadiene and in a process for producing this polymer by polymerizing 1,3-butadiene in the presence of a catalyst composition comprising (a) a trialkylaluminum, and (b) titanium tetraiodide.

We claim:

1. A method for producing rubbery, substantially gel-free polybutadiene containing at least 85 per cent cis 1,4-addition which comprises contacting 1,3-butadiene in a polymerization mixture including an inert, aromatic, liquid diluent with a catalyst formed from components consisting essentially of (a) trialkylaluminum having the formula $R_3Al$ wherein R is an alkyl radical containing up to and including 6 carbon atoms and (b) titanium tetraiodide, in a molar ratio of 1.25 to 50 mols of trialkylaluminum per mol of titanium tetraiodide, the catalyst concentration being 0.05 to 5 weight per cent based on the 1,3-butadiene, and recovering said polybutadiene from the polymerization mixture.

2. The method of claim 1 wherein said contacting is carried out within the temperature range of 10° to 50°C. and at a pressure sufficient to maintain the polymerization mixture substantially in the liquid phase.

3. The method of claim 2 wherein said trialkylaluminum is triethylaluminum.

4. The method of claim 2 wherein said trialkylaluminum is triisobutylaluminum.

5. The method of claim 2 wherein the molar ratio of said trialkylaluminum to titanium tetraiodide is within the range of 1.5 to 35.

6. The method of claim 5 wherein said aromatic diluent is benzene or toluene.

* * * * *